US012634333B2

(12) United States Patent
Goodes et al.

(10) Patent No.: US 12,634,333 B2
(45) Date of Patent: May 19, 2026

(54) ITERATIVELY TRAINED MACHINE LEARNING MODELS FOR CONFIGURATIONS OF APPLICATION PROTECTION

(71) Applicant: Zimperium, Inc., Dallas, TX (US)

(72) Inventors: Grant Stewart Goodes, Manotick (CA); Nicolás Chiaraviglio, Barcelona (ES); Jonathan Paterson, Frisco, TX (US)

(73) Assignee: Zimperium, Inc., Dallas, TX (US)

( * ) Notice: Subject to any disclaimer, the term of this patent is extended or adjusted under 35 U.S.C. 154(b) by 0 days.

(21) Appl. No.: 19/270,384

(22) Filed: Jul. 15, 2025

(65) Prior Publication Data

US 2026/0067319 A1     Mar. 5, 2026

Related U.S. Application Data

(60) Provisional application No. 63/688,748, filed on Aug. 29, 2024.

(51) Int. Cl.
H04L 9/40 (2022.01)
G06N 20/00 (2019.01)

(52) U.S. Cl.
CPC ......... H04L 63/1433 (2013.01); G06N 20/00 (2019.01)

(58) Field of Classification Search
CPC ........................... H04L 63/1433; G06N 20/00
See application file for complete search history.

(56) References Cited

U.S. PATENT DOCUMENTS

| | | | | |
|---|---|---|---|---|
| 7,424,746 | B1 * | 9/2008 | Magdych | G06F 21/55 |
| | | | | 709/224 |
| 9,705,904 | B1 * | 7/2017 | Davis | G06N 3/09 |
| 2019/0052665 | A1 * | 2/2019 | Mahieu | G06N 5/01 |
| 2019/0188390 | A1 * | 6/2019 | Gunn | G06N 5/025 |
| 2020/0366693 | A1 * | 11/2020 | Perilli | H04L 63/1416 |
| 2020/0410001 | A1 * | 12/2020 | Sarkissian | G06F 3/0482 |
| 2021/0158075 | A1 * | 5/2021 | Shoshan | G06N 3/09 |
| 2021/0218770 | A1 * | 7/2021 | Ben-Yosef | G06F 21/554 |
| 2023/0208871 | A1 * | 6/2023 | Yellapragada | G06N 3/045 |
| | | | | 726/25 |
| 2025/0110855 | A1 * | 4/2025 | Rudenko | G06F 8/35 |

(Continued)

FOREIGN PATENT DOCUMENTS

| | | | | | |
|---|---|---|---|---|---|
| CN | 115238777 | A | * | 10/2022 | G06N 20/00 |
| CN | 118170688 | A | * | 6/2024 | G06F 18/22 |

(Continued)

*Primary Examiner* — Sarah Su
(74) *Attorney, Agent, or Firm* — Fenwick & West LLP

(57) ABSTRACT

A system and a method are disclosed for generating protection actions to protect a target application. The system scans a target application to detect a potential risk associated with one or more chunks of code in the target application and determines configuration information of the one or more chunks of code. The system may input scanning results and the configuration information into machine learning models and receive an output including the one or more protection actions. The system applies the protection actions to the target application. Responsive to completing the one or more protection actions, the system re-scans the target application to determine a result of applying the one or more protection actions on the target application.

20 Claims, 5 Drawing Sheets

(56)        References Cited

U.S. PATENT DOCUMENTS

| | | | |
|---|---|---|---|
| 2025/0139243 A1* | 5/2025 | Gazit | G06F 21/563 |
| 2025/0190848 A1* | 6/2025 | Suneja | G06N 5/01 |
| 2025/0193209 A1* | 6/2025 | Hicks | G06F 21/50 |

FOREIGN PATENT DOCUMENTS

| | | | | |
|---|---|---|---|---|
| CN | 118607669 A | * | 9/2024 | G06F 11/3684 |
| CN | 119325595 A | * | 1/2025 | G06N 3/10 |
| CN | 120124050 A | * | 6/2025 | G06F 18/241 |
| EP | 3828746 A1 | * | 6/2021 | H04L 63/1433 |
| WO | WO-02096013 A1 | * | 11/2002 | H04L 63/1433 |

* cited by examiner

100

110

Security System

120

Network

130

Client Device

140

Data Store

400

ITERATIVELY TRAINED MACHINE LEARNING MODELS FOR CONFIGURATIONS OF APPLICATION PROTECTION

CROSS-REFERENCE TO RELATED APPLICATIONS

This application claims the benefit of U.S. Provisional Application No. 63/688,748, filed Aug. 29, 2024, which is incorporated by reference herein in its entirety.

TECHNICAL FIELD

The disclosure generally relates to the field of computing technology, and more particularly relates to the security protection of a software application.

BACKGROUND

Software applications face numerous security risks that can have severe consequences, such as data breaches, attacks from malicious software programs, unauthorized operations, etc. While current methods for addressing software application security issues offer essential protections, they come with significant deficiencies. Security measures can add complexity and performance overhead, affecting user experience and system efficiency. Many security measures are resource-intensive, and their configuration requires significant time and training, posing challenges for smaller organizations. Additionally, many security practices are reactive, addressing vulnerabilities only after they have been exploited, rather than proactively preventing them. Overcoming these challenges requires a balanced approach that combines robust security practices with practical considerations for usability, performance, and resource allocation.

SUMMARY

The disclosed method provides a loop of protection functions, from detecting, identifying, to protecting, thus providing an optimized protection. In some implementations, the process is automatic without human intervention. Machine learning models are used to consume the results of security-vulnerability scanning as an input and outputs optimized protection actions. A follow-up scan (i.e., re-scan) may be performed after performing the protection actions so that the results of the follow-up scan can be used as feedback to tune the machine learning models. The machine learning models are iteratively trained, including applying the protection action, re-scanning to evaluate the protection results, modifying the protection actions, re-scanning until the results reach a predetermined condition of acceptable quality. Using iteratively trained machine learning models, the disclosed method provides a systematic approach to improving model performance and reliability, thus ensuring that the generated protection actions are well-suited to meet the demands of real-world applications, adapting to feedback information and evolving conditions with efficiency and effectiveness.

Systems and methods are disclosed herein for generating protection actions to protect a target application. The system scans a target application to detect a potential risk associated with one or more chunks of code in the target application and determines configuration information for applying protections to the one or more chunks of code. The system may input scanning results and the configuration information into machine learning models and receive an output including the one or more protection actions. The system applies the protection actions to the target application. Responsive to completing the one or more protection actions, the system re-scans the target application to determine a result of applying the one or more protection actions on the detected risks.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 illustrates one embodiment of a system environment including a computing device with a security system, according to one or more embodiments.

DETAILED DESCRIPTION

Figure 1:
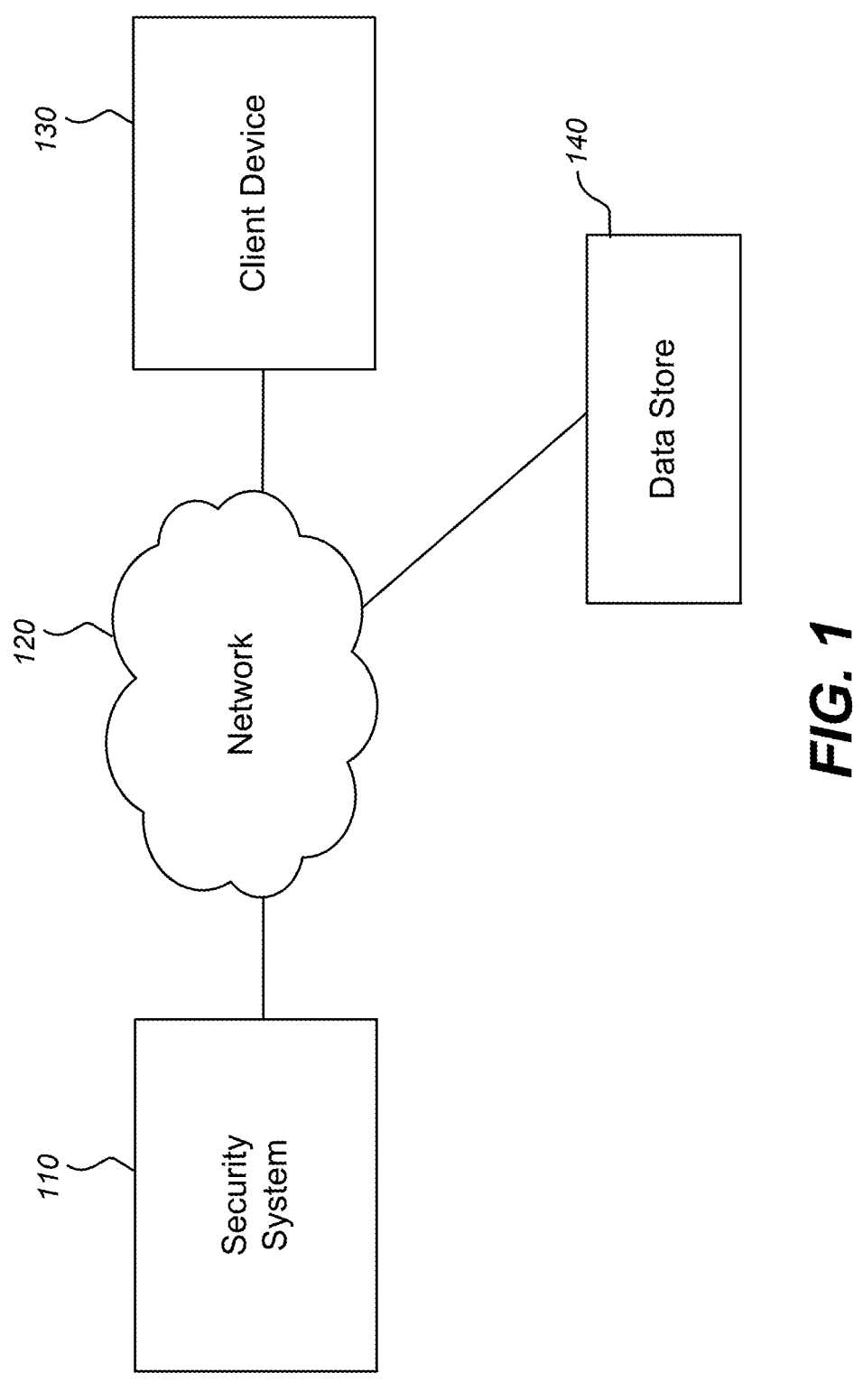

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

Figure (FIG.) 1 illustrates one embodiment of a system environment 100 including a security system 110, according to one or more embodiments. Environment 100 also includes network 120, a client device 130, and a data store 140. The system environment 100 may also include different or additional entities.

The security system 110 is a computer system that performs various cybersecurity related tasks. The security system 110 may implement various scanning and protecting tools configured to protect computing systems and data from unauthorized access, attacks, damages and/or theft. The security system 110 may include a singular computing system, such as a single computer, or a network of computing systems, such as one or more computers or a distributed computing system. The security system 110 may be one or more servers (e.g., forming a cloud-based service) that receives data and performs analysis to generate protection actions for an application. In some implementations, as the security system 110 scans a software application from a client device 130 via the network 120, the security system 110 may identify a potential risk associated with software program code of the application. The security system 110 uses machine learning models to generate protection actions to be applied to the application to handle the potential risk. After performing the protection actions, the security system 110 may re-scan the application and evaluate the result of performance of the protection actions. In some embodiments, the security system 110 may update the protection actions based on the re-scanning result and iterate the process until the result of applying to the protection actions reaches a pre-determined condition.

The security system 110 may access the client device 130 and data store 140 through the network 120. In some embodiments, the network 120 includes any combination of local area and/or wide area networks, using wired and/or wireless communication systems. The network 120 may use standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 120 may be encrypted using any suitable technique or techniques.

The client device 130 deploys software applications. The client device 130 may be a server, a computing device, an app store, a website, a physical media (e.g., hard drive, disks, etc.), and the like. The security system 110 may access the client device 130 to discover, download and install software applications. Alternatively, the client device 130 may be a cloud-based platform where the security system 110 may access and use software applications over the network 120 without having to install the applications locally. In some embodiments, the client device 130 may be a data source that includes information corresponding to the software applications, such as, program codes, metadata, raw type data, etc.

The data store 140 may include a non-transitory computer-readable storage medium that stores code of software applications and various data related to applications. In some embodiments, the data store 140 may include a library database that stores the program codes (executables of various known applications). In some embodiments, the data store 140 may include a vector database. In some embodiments, the data store 140 may store a plurality of models. In some implementations, the models may include a machine learning model. The data store 140 may be integrated as a part of the security system 110. Alternatively, the data store 140 may be located differently from the security system 110. Further details about security system 110 are described below with reference to FIGS. 2-5.

Security System Configuration

Figure 2:
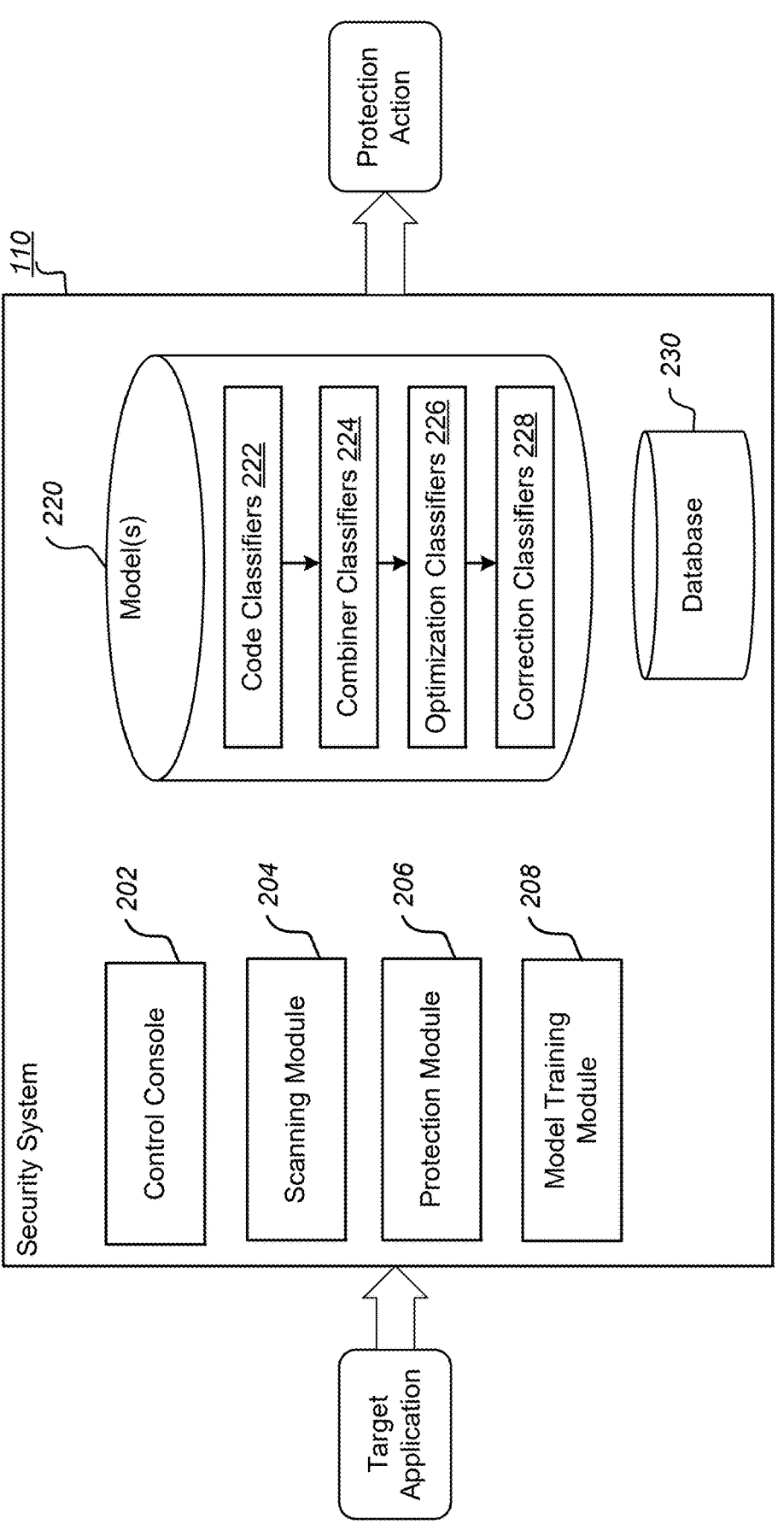
FIG. 2 illustrates one embodiment of exemplary modules of a security system, according to one or more embodiments.

FIG. 2 illustrates one embodiment of exemplary modules of a security system, according to one or more embodiments. The security system 110 is configured to receive a target application as an input and output one or more protections actions for protecting the target application. The security system 110 includes a control console 202, a scanning module 204, a protection module 206, a model training module 208, models 220, and a database 230. The modules depicted with respect to security system 110 are exemplary; more or fewer modules, and databases may be used, consistent with the disclosure provided herein.

The control console 202 is configured to support interactions between the security system 110 and the client device 130. The control console 202 may be of different types. In one embodiment, the client device 130 is a web-based platform that cooperates with a web browser to render a front-end interface. In another embodiment, the control console 202 may be a software application that operates at the client device 130. The control console 202 may provide a user interface for a user to interact with the security system 110. For example, the user interface may be the front-end component of a mobile application or a desktop application. In one embodiment, the control console 202 may provide a graphical user interface (GUI) which includes graphical elements and user-friendly control elements. Alternatively, the control console 202 may communicate between the security system 110 and the client device 130 via other suitable ways such as application program interfaces (APIs), which may include conventional APIs and other related mechanisms such as webhooks.

The control console 202 may receive input from a user. The user may input instructions to the control console 202, such as, identifying the target application, identifying the location of the target application, specifying security targets, specifying the targeted size and targeted performance, and various configurations and the like. The control console 202 receives the user's input and the security system 110 may perform security actions on the target application, such as applying scanning, protections, etc., based on the user's input. The control console 202 may output the various security information of the target application. For example, the control console 202 may display the result of security protection performed on the target application in a user interface. The control console 202 may provide before/after protection status during the process of security performance. In some implementations, the control console 202 may present runtime threat finding, timelines and trends dashboard across multiple builds/releases of the target application.

The scanning module 204 scans the application code of the target application and identifies a security risk in the target application. In some embodiments, the security risk may be associated with one or more chunks of code in the target application. A chunk of code may refer to a discrete block, segment, or snippet of code that may be analyzed, monitored, or controlled for security purposes. In some examples, a chunk of code may refer to the code of a single function in the target application. By scanning the target application, the scanning module 204 may identify attributes of the target application. The attributes of the target application may include security related attributes, such as vulnerabilities, security-sensitive code, types/categories of the application code, locations of application code, etc. In some embodiments, the attributes may include performance related information, such as control flow information, data flow information, performance process information, and the like. Using the identified attributes of the target application, the scanning module 204 may identify a security risk of the target application, for example, requiring encryption, authorization, vulnerability, etc. The scanning module 204 may apply static analysis and/or dynamic analysis to the application code of the target application to identify the attributes and the security risk. In some embodiments, the scanning module 204 may perform an initial scanning before applying any protection actions to the target application and obtain a set of initial attributes of the target application. The scanning module 204 may re-scan the target application after applying the protection actions to the target application to evaluate the results of the protection actions. In some embodiments, the protection actions may be updated based on the re-scanning results, and the scanning module 204 may iteratively re-scan the target application each time after an updated protection action is applied to the target application.

In some implementations, the application code of the target application may include one or more chunks of code. Different chunks of code may have different attributes, and the associated risks and the corresponding security actions may be different. During the scanning, the scanning module 204 may generate one or more embeddings, each representing a chunk of code in a latent space. The latent space may be of high dimensionality, and each embedding may include a plurality of dimensions, each representing a different attribute of the chunk of code, e.g., location, type, vulnerability, etc. The generated embeddings may be stored in a database (e.g., database 230). In some embodiments, the embeddings may be used to generate feature vectors for training one or more machine learning models that predict protection actions to be applied to a chunk of code represented by an embedding. In one instance, the embeddings are directly used as the feature vectors for the machine learning models. For example, similar embeddings may represent chunks of code with similar attributes, and applying the trained machine learning model to these chunks of code may generate similar protection actions. In some embodiments, the scanning module 204 may apply a machine learning model to a chunk of code and output an embedding for representing the respective chunk of code. The output embeddings may be directly used as input (e.g., feature vectors) to the machine learning model. In some embodiments, the scanning module 204 may map the generated embeddings in the latent space. In some implementations, the distance between two embeddings may indicate the similarity of the represented chunks of code. For instance, the scanning module 204 determines two similar chunks of code as their corresponding embeddings having a distance that is within a threshold distance. In other embodiments, the scanning module 204 uses K-means clustering to cluster chunks of code based on the embeddings. Using K-means clustering causes a chunk of code to be clustered based on the distance of each dimension of the embedding for the chunk of code to a mean value associated with a dimension across all embeddings. Various other methods, algorithms, and models may be used to determine the distance between the embeddings and the similarity between the chunks of code. The clusters of embeddings may represent groups of chunks of code with similar attributes. The clusters of embeddings may be used to generate feature vectors for training machine learning models for predicting protection actions. For example, the trained models may predict protection actions for a chunk of code represented by an embedding of a cluster, and the predicted protection actions may be similar to protection actions predicted for chunks of code represented by other embeddings of the same cluster.

In some embodiments, the scanning module 204 may scan code by inputting code into a large language model (LLM), with a prompt to the LLM to identify code having specified attributes (e.g., code that has importance to the security of the application in that the code has security elements or is otherwise related to application security). The LLM may output such code (e.g., the aforementioned chunks of code), and protection actions may thereafter be determined for those chunks of code.

In some embodiments, LLMs may be used for other purposes than, or in addition to, performing classifications of chunks of code. For example, the scanning module 204 may prompt an LLM to create a data set of example chunks of code as mapped to a measure of importance to protect each given chunk of code (e.g., based on importance to security of an application). Alternatively, a human may manually generate this data set. The scanning module 204 may generate representations (e.g., embeddings) for each of the chunks of code in the data set as labeled by a corresponding importance measure and train a machine learning model to accept new chunks of code as input and to output a measure of importance in protecting the new chunks of code. The scanning module 204 may then take the chunks of code at issue and input them into the machine learning model, and may determine to apply protection actions to chunks of code having at least a threshold measure of importance.

The protection module 206 determines protection actions to the target application. In some embodiments, the protection module 206 may determine the protection actions based on attributes and configuration information of the target application. The configuration information may include security targets, targeted size and targeted performance of the protection actions. For example, the security targets may be to ensure the target application's confidentiality, integrity, availability, etc. Confidentiality may involve safeguarding sensitive data through encryption and access control to prevent unauthorized access. Integrity may ensure data accuracy and system reliability by preventing unauthorized modifications and maintaining the target application's functionality. The targeted size and targeted performance may refer to the constraints and limitations regarding the impact of the protection actions on the target application, such as resource usage and overall performance. For instance, the targeted size may include constraints associated with the executable file size for the target application when the protection action is applied. The targeted size may also include limitations on the size of transmitted data, including metadata (e.g., encryption keys, tokens, etc.) to avoid bloating network traffic. In some implementations, the targeted performance may include constraints on the latency, processing overhead, memory usage, network performance, and the like. For example, the targeted performance may limit the security-related processing (e.g., real-time monitoring, data validation) does not excessively consume CPU resources, which could degrade overall application performance.

In some implementations, the protection module 206 may identify one or more chunks of code to be protected. For each chunk of code, the protection module 206 may determine a protection action based on the corresponding attributes and configuration information. The configuration information may vary depending on the specific chunk of code. For example, one chunk of code may have different targeted size and targeted performance from another chunk of code. In some examples, a target application may include a plurality of chunks of code to be protected, and each chunk of code has its corresponding configuration information. In some implementations, the target application may include an overall targeted size and targeted performance that combine the targeted size and targeted performance of all chunks of code. Based the security target, the targeted size, and/or the targeted performance, the protection module 206 may select, adjust, and balance the protection actions to be applied. For example, the protection module 206 may evenly distribute a targeted size increase allowed for the protection action applied to each chunk of code; alternatively, the protection module 206 may prioritize the protection actions for some chunks of the code, e.g., a chunk of code with higher security risk.

In some embodiments, the protection module 206 may obtain the configuration information based on the scanning results. For example, the protection module 206 may generate the configuration information based on the scanning results (e.g., attributes of one or more chunk of code in the target application). Alternatively, the configuration may be provided by the user, and the protection module 206 may receive input from the user to determine the configuration information. For example, the control console 202 may provide an interface element for the user to select enable/disable certain protections. In some examples, the control console 202 may provide an interface element that allows a user to select (e.g., radio-dials) a level of protection to be applied. In some implementations, the protection module 206 may automatically determine the configuration information, and the user may further customize the determined configuration information, for example, a user may increase/decrease the amount of protection applied to the target application. In some embodiments, the protection module 206 may determine the configuration information of the target application based on heuristic decisions and/or model-based decisions. For example, the protection module 206 may determine configuration information of a chunk of code based on the corresponding embedding. Similar chunks of code may have similar configuration information. In some implementations, the protection module 206 may use iterative feedback-based decisions. The protection module 206 may start with initial configuration information and evaluate the configuration information as exploring the adjacent code around the chunk of code. Exploring the adjacent code may refer to testing similar configurations and/or applying random configuration changes. Based on received feedback, the protection module 206 may modify the configuration information of the target application.

Based on the configuration information, the protection module 206 may determine the protection actions to be applied on the target application. A variety of protection actions and measures may be used to safeguard against threats and vulnerabilities, ensuring confidentiality, integrity, and availability. The protection actions may include code/data obfuscation that transforms software code and data into a form that is difficult to understand by static analysis while still maintaining the original functionality of the application. The protection actions may include various forms of runtime application self-protection (VASR) checks that are injected to make dynamic analysis and exploitation difficult or impossible. In some implementations, the protection actions may include a platform-integrity and threat monitoring software development kit (SDK) which may be injected into the target application to provide dynamically updatable detections, flexible detection-response policies, real-time threat monitoring via telemetry from the target application to a server, and the like.

The protection module 206 determines configuration of the protection actions, e.g., what protection actions to be applied, where to apply and how much protection to apply to protect the target application. In some embodiments, the protection module 206 balances the security target, targeted size and targeted performance to comply the overall constraints and limitations indicated by the configuration information (e.g., expressed as a percentage increase over the unprotected state of the target application) and provide a better user experience. For example, the protection module 206 selects and adjusts the protection actions based on the risk assessment, ensuring critical areas that are protected without overburdening the system. The protection module 206 may regularly test the target application's performance (e.g., re-scanning) and/or receive feedback to identify and mitigate any negative impacts caused by the protection actions. The protection module 206 may continuously modify/optimize security algorithms and processes to reduce their resource consumption.

In some embodiments, the protection module 206 may apply a machine learning model to determine the protection actions to be applied to the target application. The machine learning model is trained to generate one or more protection actions to protect one or more chunks of code in a target application. The machine learning model is trained by the model training module 208 using unsupervised learning, supervised learning, deep learning, reinforcement learning, self-supervised learning, or any other suitable training method. The protection module 206 inputs the scanning result (e.g., attributes) and configuration information to the machine learning model which outputs the protection actions to be applied. In one implementation, the scanning result may be an embedding that represents the chunk of code, and the embedding may be input to the machine learning model for predicting protection action. In some embodiments, for each chunk of code included in the target application, the protection module 206 determines at least one protection action for the chunk of code. Alternatively, the protection module 206 may determine a set of overall protection actions that applied to the target application. In some embodiments, the protection module 206 may update the configuration of the protection actions based on updated scanning results of the target application. For example, after the first set of protection actions are performed on the target application, the scanning module 204 may scan and evaluate the protected target application. Based on the result of the re-scanning, the protection module 206 may update the configuration of the protection actions, e.g., adjusting protection location, increasing/decreasing protection amount/level, changing types of protection actions, etc. The protection module 206 may iteratively update the configuration of the protection actions until the protected target application meets a pre-determined condition, e.g., the security target, size target, and/or targeted performance, etc.

The model training module 208 trains a machine learning model in various ways. In some embodiments, the machine learning model is trained based on a set of training examples. Each training example includes input data to which the machine learning model is applied to generate an output. For example, each training example may include a chunk of code associated with a security risk of an application, the attributes and configuration information of the chunk of code. In some implementations, the attributes of the chunk of code may be represented by an embedding. The embedding, security risk, and the configuration information may be used to generate a feature vector for training the machine learning model. In some cases, the training examples also include a label which represents an output (e.g., a protection action responsive to the security risk) of the machine learning model. In these cases, the machine learning model is trained by comparing its output from input data of a training example to the label for the training example. In general, during training with labeled data, the set of parameters of the model may be set or adjusted to reduce a difference between the output for the training example (given the current parameters of the model) and the label for the training example. In some implementations, the label may be generated by a manual process or by an automatic process. In some cases, the machine learning model may be trained purely "on the fly," e.g., correction classifiers, which is trained by labeled observations generated in the course of an iterative learning scheme. For example, the classifiers are trained in a self-supervised manner. Some machine learning models may be trained by a hybrid of the two approaches. The machine learning model may be initially trained by a manually prepared labeled observation dataset, and then refined by additional labeled observations generated during the course of the iterative learning process (e.g., a new observation of the size-increase on a given code-snippet with a given protection feature, differing from the previously predicted value generated by the model.

The model training module 208 may apply an iterative process to train a machine learning model whereby the model training module 208 updates parameter values of the machine learning model based on each of the set of training examples. For example, the machine learning model may be fine-tuned for a customer's application. The training examples may be processed together, individually, or in batches. In some implementations, the model training module 208 scores the output from the machine learning model using a loss function. A loss function is a function that generates a score for the output of the machine learning model such that the score is higher when the machine learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The protection module 206 iteratively updates the set of parameters for the machine learning model based on the score generated by the loss function until the score meets a pre-determined condition (e.g., a threshold value). For example, the protection module 206 may apply gradient descent to update the set of parameters.

In some embodiments, the trained machine learning model may be evaluated by applying the protection actions to the target application and re-scanning the protected target application. The results of the re-scanning may include performance metrics such as security targets, targeted size and targeted performance, and loss that are calculated to assess the model's effectiveness. The performance metrics may be used as feedback to the machine learning model, and the configuration of the protection actions may be updated through re-training and fine-tuning the machine learning model. For example, the updated configuration of the protection actions may include changing the type of the protection action, adjusting the location that the protection action to be performed, the amount of the protection action to be applied, etc. In some embodiments, after each iteration, the scanning module 204 re-scans the target application to detect a result of performing the protection action on the target application, and the machine learning model is re-evaluated to monitor improvements and check for issues like overfitting. This cycle of retraining and re-evaluation continues until a pre-determined condition is met, for example, the model's performance stabilizes, a predefined security target is satisfied, a targeted size or targeted performance is met. Once the pre-determined condition is met, the iterative process reaches a stopping point, and the final version of the trained machine learning model is selected and may be deployed into protection of the target application.

The models 220 may include various models. In some embodiments, the models may include a machine learning model. Examples of which include different forms of unsupervised learning, supervised learning, and/or self-supervised learning, for example, clustering, embeddings such as word embeddings, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. The attributes (e.g., embeddings) and configuration information of a target application may be converted to a feature vector that includes different dimensions. The feature vectors can be inputted into the machine learning model to iteratively train the machine learning model.

In some embodiments, one or more models may be applicable to a specific application, and the models may be updated as the application evolves over time, e.g., updated code for the same application in a newer release. In some embodiments, the models may be applicable to a specific category/type of application, e.g., image processing application, business transaction application, loyalty program application, etc. In some embodiments, the models may be applicable to any and all applications. In some embodiments, the models may be customized for different applications and/or based on different customer requirements.

As shown in FIG. 2, in one implementation, the models 220 may include a plurality of classifiers, such as, code classifier 222, combiner classifier 224, optimization classifier 226, correction classifier 228, etc. The security system 110 includes a control console 202, a scanning module 204, a protection module 206, a model training module 208, models 220, and a database 230. The classifiers depicted with respect to models 220 are exemplary; more or fewer models, and different type of models may be included, consistent with the disclosure provided herein. The code classifier 222 may be used to categorize a chunk of code in a single function and output a specific classification of the chunk of code. For example, the code classifier 222 may predict a size increase that is caused by applying a specific protection action at a specific level of aggressiveness and assign a measure of "security sensitivity" to a given chunk of code. The combiner classifier 224 may combine the outputs of one or more code classifiers 222 and ensure that the combine output satisfies the security targets/constraints. For example, the combiner classifier 224 may combine an output of a model that predicts a size increase of a given protection action with an output of another model that predicts a performance slowdown for the same protection action, while ensuring the combined output satisfies a targeted size and/or targeted performance. The optimization classifier 226 may balance between the security targets and the constraints. For example, the optimization classifier 226

(e.g., Knapsack classifier) may determine a solution of applying as much protection action as possible to as many locations as possible while fitting with a given size or performance target (e.g., size increase and/or performance slowdown). The correction classifier 228 may operate on the output of other classifiers and apply a correction factor to better reflect the desired outcome. For example, the correction classifier 228 may increase/decrease the amount of protection actions. The correction classifier 228 may fine-tune the trained machine learning model, allowing for nuanced, second-order optimization of the machine learning mode.

In some embodiments, the classifiers in the models 220 may be applied in a hierarchical order, proceeding from the code classifier 222, the combiner classifier 224, the optimization classifier 226, and to the correction classifier 228. In some embodiments, multiple iterations of trainings may be performed. Training may be completed when the objective function has become sufficiently stable (e.g., the machine learning model has converged) or after a predetermined number of rounds for a particular set of training samples. The trained machine learning model can be used for determining a set of protection actions to be applied to a target application using the attributes and configuration information of the target application as an input.

The database 230 may be configured to store data. In some embodiments, the database 230 may store codes of a plurality of applications. In some embodiments, the database 230 may include a vector database configured to store embeddings in a latent space, and an embedding may represent a chunk of code in a software application. In some embodiments, the database 230 may store the one or more models, for example, the trained machine learning models, parameters of the trained machine learning models, a plurality of training examples for training the machine learning models, etc. In some embodiments, the database 230 may store data associated with the scanning/protection etc., such as, reports and detailed data resulting from the scanning and protection process. The database 230 uses computer-readable media to store data and may use databases to organize the stored data.

Iterative Training Process of Machine Learning Model

Figure 3:
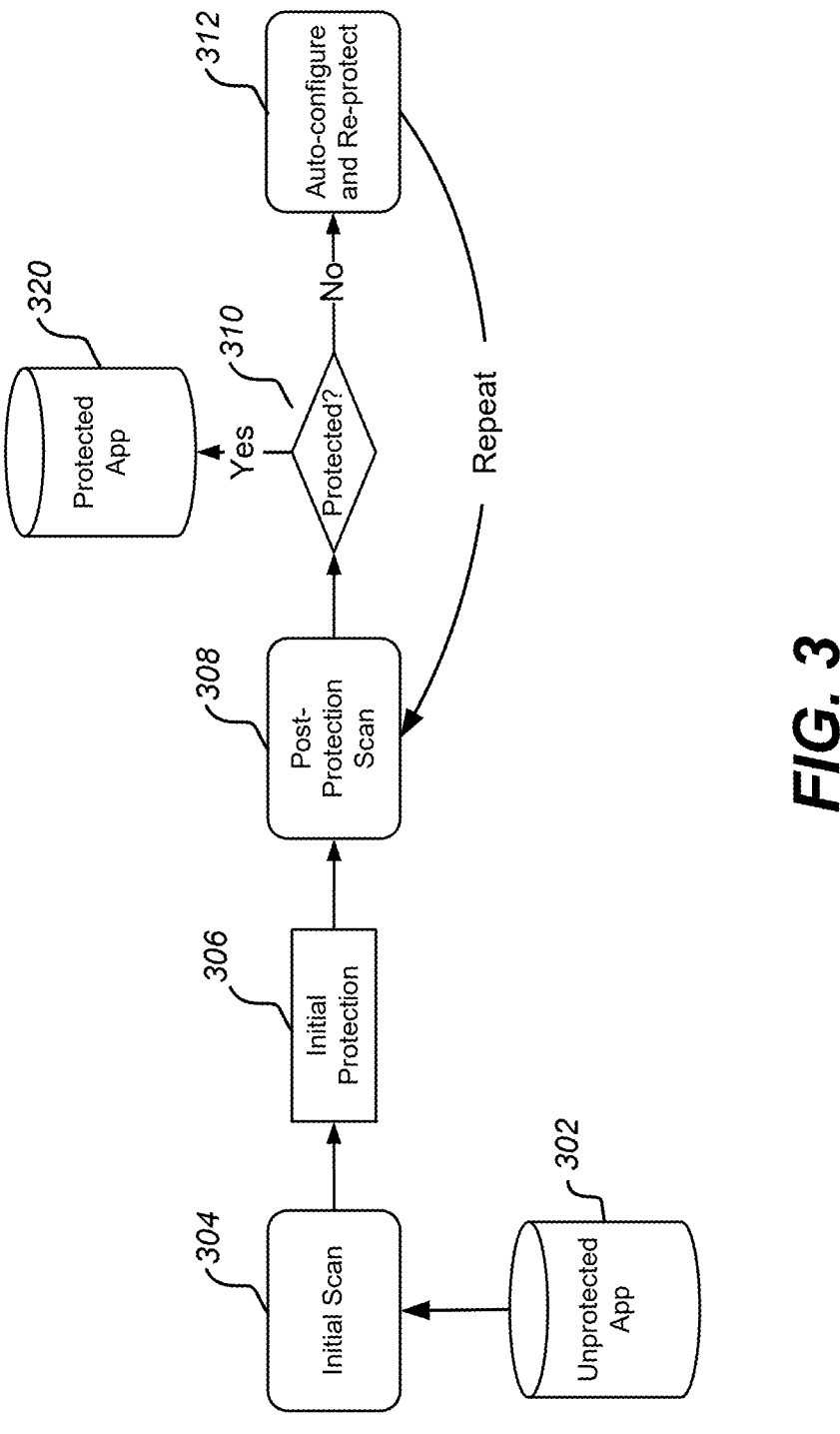
FIG. 3 is a conceptual diagram of a process of iteratively training a machine learning model to determine protection actions for a target application, according to one or more embodiments.

FIG. 3 is a conceptual diagram of a process 300 of iteratively training a machine learning model to determine protection actions for a target application, according to one or more embodiments. In various embodiments, the process includes different or additional steps than those described in conjunction with FIG. 3. Further, in some embodiments, the steps of the process may be performed in different orders than the order described in conjunction with FIG. 3. The process described in conjunction with FIG. 3 may be carried out by the security system 110 in various embodiments.

As shown in FIG. 3, the security system 110 accesses an unprotected application 302 as a target application to be protected. The security system 110 may apply an initial scanning 304 to the target application. The scanning may include static scanning and dynamic scanning. Scanning the target application may be used to analyze the target application and determine the attributes and configuration information of the target application. In some embodiments, the security system 110 may generate an embedding for representing the code of the target application. The configuration information may include locations of code that needs to be protected, for example, some of the code in the target application may be completely unprotected. The security system 110 may identify a security risk of the target application based on the scanning result. The security system 110 may determine a targeted size, e.g., 30% increase in size, and a targeted performance, e.g., 20% decrease in speed, for the target application. The configuration information may describe which protection feature (e.g., F1, F2, etc.) that need to be protected, and what level of protection should be applied. In some implementations, the configuration information may indicate one or more code locations for injecting the platform integrity checks. In some embodiments, the security system 110 may scan the target application to identify control flow, dead code, performance hotspots, and other information of the runtime behavior of the target application. Based on the scanned information, the security system 110 may generate signals to the configuration of the protection actions and the platform integrates configurations in the form of "emphasize upwards/downwards" values based on the code locations (e.g., function names, or code hashes).

In some embodiments, the security system 110 may apply one or more initial protection actions 306, for example, the protection actions may include different levels of aggressiveness and protection applications include a platform integrity check that is injected to the target application. The initial protection 306 may be determined based on a random decision, a heuristic decision, a model-based decision, or the combination thereof. In some implementations, the model-based decision may include supervised machine learning models that are trained using a large number of function samples. The samples may be labeled by the resulting size increase and execution-speed decrease after applying each of the protection features at each of the three levels of aggressiveness. For example, the label "F1 to Sz" may indicate Feature 1 with a size change, the label "F2 to Sp" may indicate Feature 2 with a speed change, and the like.

In some embodiments, the machine learning model may include an iterated Knapsack packing algorithm, designed to find a close-to-optimal set of code-locations subject to protection features F1 and F2 at one of the three levels (with the Knapsack being the size and performance constraints). For example, code-locations may be assigned a "weight" proportional to their security sensitivity, and inversely proportional to the cost (size or performance) of protection action. The security system 110 may use a heuristic decision to maximize protections initially for choosing code locations and protection levels. When the protection actions reach or exceed the constraints, the security system 110 may re-iterate with down-corrective weights to the protection actions, adjusting the code location and level of aggressiveness until a satisfactory result is obtained.

The security system 110 may apply a post protection scan 308 to evaluate the protection result. For example, based on the post protection scan 308, the security system 110 may determine, at the level of individual functions, the performance that is slowed down after the protection actions are applied. In some implementations, the post protection scan 308 may be performed by scanning the target application on a client device that is running the protected target application. The security system 110 may determine if the security target is met, e.g., whether a chunk of security sensitive code was protected. The security system 110 may generate new weighting signals for code location where the protection actions caused overly slow/large protection or inadequately protected code. If the constraints, e.g., targeted size and targeted performance are met and the security sensitive code was protected 310, the security system 110 may deliver the protected target application with the configuration of the protection actions 320. Alternatively, if the targets and/or constraints are not met, the security system 110 may re-run the protection process 312 in which the result of the re-scanning is used to update the protection actions. The security system 110 may use the actual performance data determined by the re-scanning and update machine learning model. For example, for a heuristic decision model, the security system 110 may train a new corrective model with features F1corr and F2corr to fine-tune the heuristic decision model in the correct direction based on the weighting signals obtained from the re-scanning. In some embodiments, the security system 110 may update the Knapsack packing algorithm model and/or the platform integrity check injection locations based on the weighting signals obtained from the re-scanning. The security system 110 may apply the re-trained/fine-tuned machine leaning model to generate updated protection actions and apply the updated protection action to the target application. The security system 110 may repeat this process and iteratively trains the machine learning model until the pre-determined condition is met, e.g., targeted size and targeted performance are met and the security sensitive code was protected.

Method of Generating Protection Action Using Machine Learning Model

Figure 4:
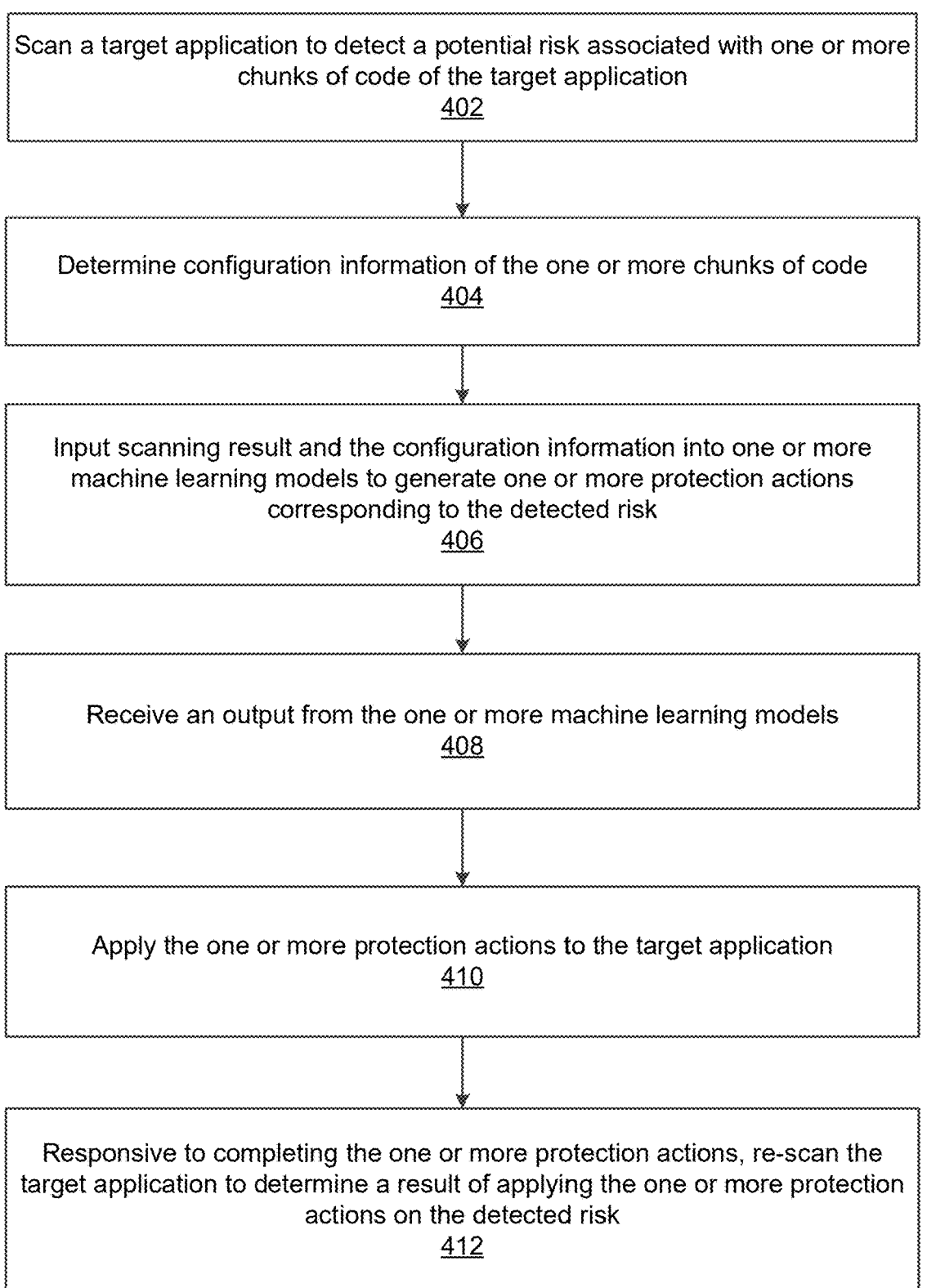
FIG. 4 illustrates one embodiment of a process for determining one or more protection actions for protecting a target application, according to one or more embodiments.

FIG. 4 illustrates one embodiment of a process 400 for determining one or more protection actions for protecting a target application, according to one or more embodiments. In various embodiments, the process includes different or additional steps than those described in conjunction with FIG. 4. Further, in some embodiments, the steps of the process may be performed in different orders than the order described in conjunction with FIG. 4. The process described in conjunction with FIG. 4 may be carried out by the security system 110 in various embodiments.

As shown in FIG. 4, the security system 110 scans 402 a target application to detect a potential risk associated with one or more chunks of code in the target application. Scanning the target application may include identifying a location of each chunk of code of the target application. The security system 110 determines 404 configuration information of the one or more chunks of code. The configuration information may include security targets, targeted size and targeted performance of protection actions to be applied to the target application. The security system 110 inputs 406 the scanning result and the configuration information into one or more machine learning models to generate one or more protection actions corresponding to the detected risk. The security system 110 receives 408 an output from the one or more machine learning models. The output may include the one or more protection actions to be applied to the target application. The security system 110 applies 410 the one or more protection actions to the target application. Responsive to completing the one or more protection actions, the system 110 re-scans 412 the target application to determine a result of applying the one or more protection actions on the detected risk.

Figure 5:
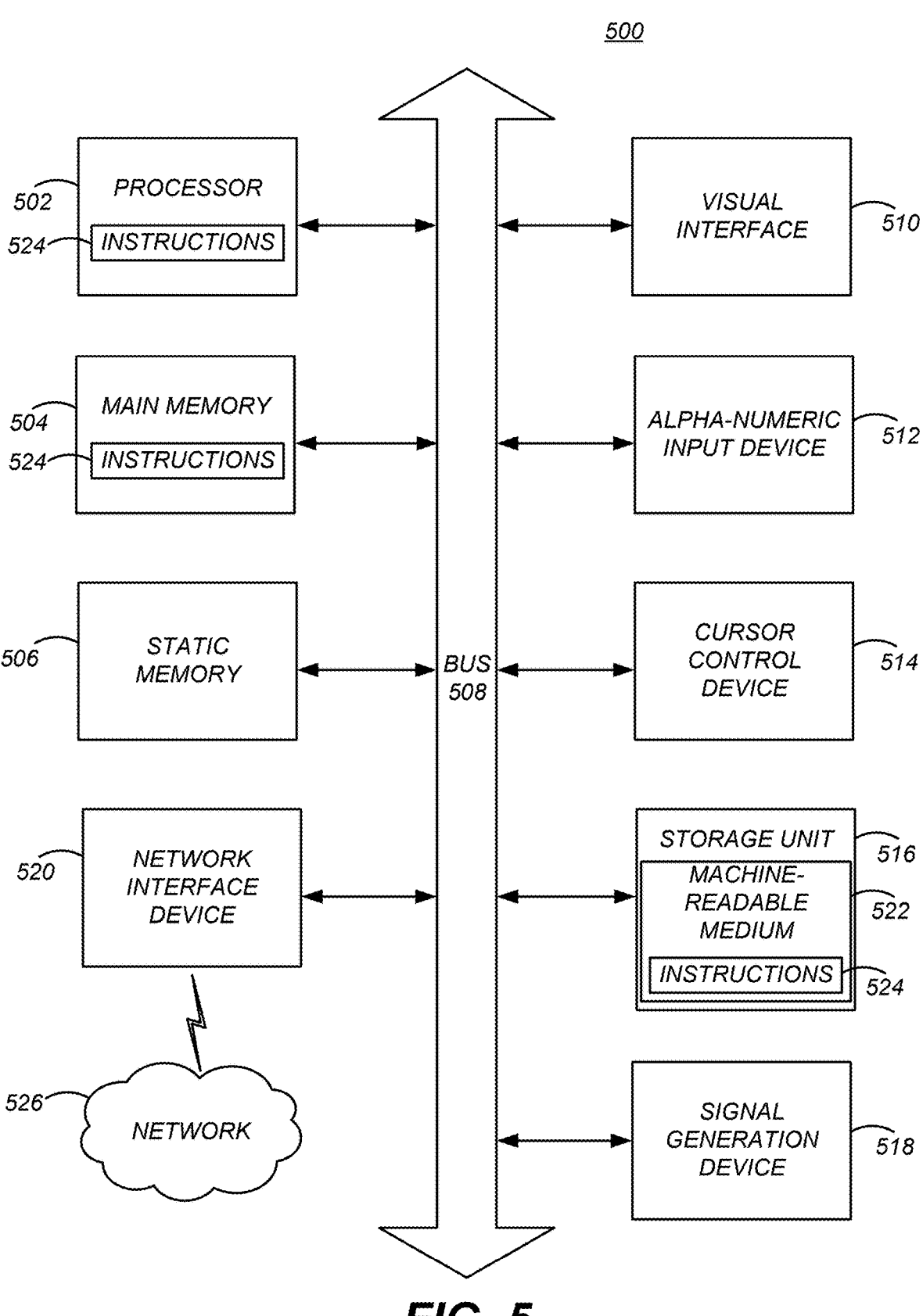
FIG. 5 is a block diagram illustrating components of an example machine able to read instructions from a machine-readable medium and execute them in a processor (or controller), according to one or more embodiments.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).) Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
generating a scanning result by scanning a target application to detect a potential risk associated with one or more chunks of code in the target application, comprising identifying a location of each chunk of code of the target application;
determining configuration information for each chunk of code of the one or more chunks of code;
for each respective chunk of code of the one or more chunks of code inputting its respective scanning result and its respective configuration information into a machine learning model;
receiving, for each respective chunk of code of the one or more chunks of code, as output from the machine learning model, an indication of respective one or more protection actions to apply to the respective chunk of code;
applying each of the respective one or more protection actions to the target application; and
responsive to completing the one or more protection actions, determining a result of applying the one or more protection actions on the target application by re-scanning the target application.

2. The method of claim 1, wherein the configuration information comprises at least one or more of a security target, a targeted size, or a targeted performance.

3. The method of claim 1, wherein scanning the target application comprises:
generating one or more embeddings, each embedding representing one chunk of code in a latent space; and
generating, using the one or more embeddings, a feature vector as input to the machine learning model.

4. The method of claim 1, wherein scanning the target application comprises:
identifying a set of attributes of the one or more chunks of code; and
determining the potential risk by applying a model to the set of attributes.

5. The method of claim 1, wherein training the machine learning model comprises:

accessing a training dataset comprising a plurality of training examples, each training example including a chunk of code associated with a security risk of an application, and configuration information of the chunk of code.

6. The method of claim 1, wherein training the machine learning model comprises:

updating the machine learning model by updating the one or more protection actions based on the result of applying the one or more protection actions on the target application; and iteratively applying the one or more protection actions on the target application until the result meets a pre-determined condition.

7. The method of claim 1, further comprising:

determining whether the result of applying the one or more protection actions on the target application meets a pre-determined condition; and responsive to determining that the result of applying the one or more protection actions on the detected risk does not meet the pre-determined condition, inputting a re-scanning result and the configuration information into the one or more machine learning models to generate one or more updated protection actions.

8. The method of claim 1, wherein scanning the target application comprises:

inputting a prompt including code of the application into a large language model; and receiving an output from the large language model identifying the chunks of code based on the chunk of codes corresponding to one or more security risks.

9. The method of claim 1, wherein scanning the target application comprises:

inputting a code of the application into a machine learning model, the machine learning model trained using example data comprising representations of chunks of code each labeled by a corresponding measure of importance; and receiving an output from the machine learning model of a measure of importance of the code; and determining that the code should be protected responsive to the measure of importance exceeding a threshold.

10. A non-transitory computer readable medium configured to store instructions, the instructions when executed by one or more processors causing the processor to perform operations comprising:

generating a scanning result by scanning a target application to detect a potential risk associated with one or more chunks of code in the target application, comprising identifying a location of each chunk of code of the target application;

determining configuration information for each chunk of code of the one or more chunks of code;

for each respective chunk of code of the one or more chunks of code inputting its respective scanning result and its respective configuration information into a machine learning model;

receiving, for each respective chunk of code of the one or more chunks of code, as output from the machine learning model, an indication of respective one or more protection actions to apply to the respective chunk of code;

applying each of the respective one or more protection actions to the target application; and responsive to completing the one or more protection actions, determining a result of applying the one or more protection actions on the target application by re-scanning the target application.

11. The non-transitory computer readable medium of claim 10, wherein scanning the target application comprises:

identifying a set of attributes of the one or more chunks of code; and determining the potential risk by applying a model to the set of attributes.

12. The non-transitory computer readable medium of claim 10, wherein training the machine learning model comprises:

accessing a training dataset comprising a plurality of training examples, each training example including a chunk of code associated with a security risk of an application, and configuration information of the chunk of code.

13. The non-transitory computer readable medium of claim 10, wherein the instructions when executed by one or more processors causing the processor to perform further operations comprising:

updating the machine learning model by updating the one or more protection actions based on the result of applying the one or more protection actions on the target application; and iteratively applying the one or more protection actions on the target application until the result meets a pre-determined condition.

14. The non-transitory computer readable medium of claim 10, wherein the instructions when executed by one or more processors causing the processor to perform further operations comprising:

determining whether the result of applying the one or more protection actions on the target application meets a pre-determined condition; and responsive to determining that the result of applying the one or more protection actions on the detected risk does not meet the pre-determined condition, inputting a re-scanning result and the configuration information into the one or more machine learning models to generate one or more updated protection actions.

15. A system comprising memory with instructions encoded thereon that, when executed by one or more processors, cause the one or more processors to perform operations comprising:

generating a scanning result by scanning a target application to detect a potential risk associated with one or more chunks of code in the target application, comprising identifying a location of each chunk of code of the target application;

determining configuration information for each chunk of code of the one or more chunks of code;

for each respective chunk of code of the one or more chunks of code inputting its respective scanning result and its respective configuration information into a machine learning model;

receiving, for each respective chunk of code of the one or more chunks of code, as output from the machine learning model, an indication of respective one or more protection actions to apply to the respective chunk of code;

applying each of the respective one or more protection actions to the target application; and responsive to completing the one or more protection actions, determining a result of applying the one or more protection actions on the target application by re-scanning the target application.

16. The system of claim 15, wherein the configuration information comprises at least one or more of a security target, a targeted size, or a targeted performance.

17. The system of claim 15, wherein scanning the target application comprises:

generating one or more embeddings, each embedding representing one chunk of code in a latent space; and generating, using the one or more embeddings, a feature vector as input to the machine learning model.

18. The system of claim 15, wherein scanning the target application comprises:

identifying a set of attributes of the one or more chunks of code; and determining the potential risk by applying a model to the set of attributes.

19. The system of claim 15, wherein training the machine learning model comprises:

accessing a training dataset comprising a plurality of training examples, each training example including a chunk of code associated with a security risk of an application, and configuration information of the chunk of code.

20. The system of claim 15, wherein the instructions encoded thereon that, when executed by one or more processors, cause the one or more processors to perform further operations comprising:

determining whether the result of applying the one or more protection actions on the target application meets a pre-determined condition; and responsive to determining that the result of applying the one or more protection actions on the detected risk does not meet the pre-determined condition, inputting a re-scanning result and the configuration information into the one or more machine learning models to generate one or more updated protection actions.

* * * * *